United States Patent
Idicula et al.

(10) Patent No.: US 9,582,525 B2
(45) Date of Patent: Feb. 28, 2017

(54) TECHNIQUE TO GATHER STATISTICS ON VERY LARGE HIERARCHICAL COLLECTIONS IN A SCALABLE AND EFFICIENT MANNER

(75) Inventors: Sam Idicula, Santa Clara, CA (US); Asha Tarachandani, Newark, CA (US); Bhushan Khaladkar, Mountain View, CA (US); Nipun Agarwal, Santa Clara, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1430 days.

(21) Appl. No.: 12/555,198

(22) Filed: Sep. 8, 2009

(65) Prior Publication Data

US 2011/0060726 A1   Mar. 10, 2011

(51) Int. Cl.
  *G06F 7/00* (2006.01)
  *G06F 17/30* (2006.01)
(52) U.S. Cl.
  CPC .............................. *G06F 17/30306* (2013.01)
(58) Field of Classification Search
  CPC ................................................ G06F 17/30306
  USPC ....................................................... 707/778
  See application file for complete search history.

(56) References Cited

U.S. PATENT DOCUMENTS

| | | | |
|---|---|---|---|
| 6,519,580 B1 * | 2/2003 | Johnson .............. | G06F 17/3061 706/16 |
| 2003/0097365 A1 * | 5/2003 | Stickler ................. | G11B 27/32 |
| 2003/0182268 A1 * | 9/2003 | Lal ..................... | G06F 17/30917 |
| 2006/0288026 A1 * | 12/2006 | Zayas ................. | H04L 67/1097 |
| 2007/0179934 A1 * | 8/2007 | Basov ............... | G06F 17/30336 |
| 2008/0281801 A1 * | 11/2008 | Larson .............. | G06F 17/30595 |

OTHER PUBLICATIONS

"22 SQL Access Using Resource_View and Path_View" Oracle® XML DB Developer's Guide 10g Release 2 (10.2) downloaded from the Internet on Jul. 15, 2009 < http://dowload.oracle.com/docs/cd/B19306_01/appdev.102/b14259 . . . > (21 pages).

* cited by examiner

*Primary Examiner* — Van Oberly
(74) *Attorney, Agent, or Firm* — Hickman Palermo Becker Bingham LLP

(57) ABSTRACT

Techniques are provided for efficiently collecting statistics for hierarchically-organized collections of data. A database system leverages container-level modification time stamps and stored subtree-level change information to gather statistical information from only those resources in a hierarchical collection for which the statistics have changed since the last time that statistics were gathered for the collection. A lockless data structure is also described for storing the subtree-level change information in which an identifier corresponding to each subtree in a collection containing a changed resource may be stored. This data structure may be a table that is distinct from one or more tables representing the collection. In one embodiment of the invention, the immediate parent resource of a particular modified resource may be omitted from the subtree table by leveraging modification time stamps while gathering statistics based on tracked subtree-level information.

26 Claims, 11 Drawing Sheets

200

FIG. 7

TECHNIQUE TO GATHER STATISTICS ON VERY LARGE HIERARCHICAL COLLECTIONS IN A SCALABLE AND EFFICIENT MANNER

FIELD OF THE INVENTION

The present invention relates to efficiently collecting statistics for hierarchically-organized collections of data, and specifically to selectively collecting statistical information from resources in a collection based on tracked change information.

BACKGROUND

Database systems may be configured to store data that is organized hierarchically. Examples of such hierarchically-organized data include a file systems or repositories where files are organized in a folder tree, and xml data where xml nodes are organized as parent and child nodes, etc. The elements of hierarchically-organized data are herein referred to as "resources", non-limiting examples of which include files, folders, and xml nodes. Resources that refer to other resources, or that are parents of other resources, are referred to herein as "container resources", or simply "containers". An identifier may be associated with a particular resource, which uniquely identifies the resource from among a group or collection of resources that includes the particular resource.

Hierarchical data within a database system may be exposed to queries in any number of ways. For example, the Oracle XML DB exposes hierarchical data using predefined public views, called RESOURCE_VIEW and PATH_VIEW. These public views are described in more detail in the Oracle XML DB Developer's Guide, 10 g Release 2, Part Number B14259-02, Chapter 22, accessed on Jul. 9, 2009, at http://download.oracle.com/docs/cd/B19306_01/appdev.102/b14259/xdb18res.htm#sthref2107, the contents of which are incorporated by reference in their entirety for all purposes as if fully set forth herein.

The following example query selects resources from a public view, which exposes hierarchical data to queries in a manner that may be similar to RESOURCE_VIEW described above. The example query selects resources that are authored by SCOTT and that are in a subtree rooted at "/public".

```
select extractvalue(v.res, '/Resource/DisplayName') from view v where
    under_path(v.res, '/public')=1
    and extractValue(v.res, '/Resource/Author')='SCOTT';
```

If the database system managing the data for this example query includes an index on the 'Author' property, then the query optimizer of the database system may choose one of two possible ways to execute the example query. First, the database system may perform an index scan on the 'Author' property, and then determine whether each of the resulting resources, i.e., resources authored by SCOTT, falls under the subtree rooted at '/public'. Alternatively, the database system may first enumerate the resources in the given subtree, and then determine which of the resources in the subtree are authored by SCOTT, according to the respective 'Author' property for each resource.

To determine which plan to choose, the query optimizer generally requires the cost and selectivity of each of the two predicates of the example query, i.e., the 'under_path' predicate, and the 'Author' property predicate. For the predicate on the 'Author' property, the cost and selectivity of the predicate is efficiently determined using existing relational statistics.

However, because the under_path predicate determines which resources are included in a subtree rooted at a given path in a hierarchical collection, the cost and selectivity determinations for this predicate are based on statistical information about resources in the hierarchical collection. Examples of statistical information that may be used by a query optimizer to determine the most efficient means of accessing hierarchical data include the number of non-container resources under a container resource, the total number of container resources under a container resource, the total number of resources in a subtree, the number of data blocks occupied by a subtree, the average length of resource names in a subtree, etc.

Traditionally, a database system inspects every resource of a hierarchical collection to gather statistical information for the collection. Resources in such a collection are changed, i.e., added, removed, and renamed, on a regular basis. Therefore, statistics for the collection should also be gathered regularly, e.g., daily, to ensure that the query optimizer has current statistical information for the collection, which allows the query optimizer to effectively choose optimal query plans for data in the collection.

However, collecting such statistical information for a collection consumes system resources and time, which can interfere with other processing on the collection. This problem is exacerbated in hierarchical collections containing large amounts of data, since the amount of system resources and time attributable to collecting statistical information usually increases as the amount of data in a collection increases.

Statistical information is often gathered during scheduled system "down times" or during times of minimal user activity to reduce interference with client processing. However, the task of collecting statistical information that is initiated during a down time cannot always be completed during the allocated time period. When the collection of statistics cannot be completed during the allocated time period, either the collection task is allowed to continue until the task is completed, or the collection task is prematurely terminated. Allowing the collection of statistics to continue beyond scheduled down times can interfere with other time-critical processing. On the other hand, prematurely terminating the collection of statistical information can be problematic because collecting statistics generally cannot be stopped and restarted at a later time since the data for which statistics are being collected may change before the next scheduled down time. As a result, a prematurely terminated collection of statistical information is completely re-executed at a later time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7 illustrates an example method of gathering statistical information based on modification time stamps and subtree-level information stored in a lockless data structure.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for efficiently collecting statistics for hierarchically-organized collections of data. A database system leverages container-level modification time stamps and stored subtree-level change information to gather statistical information from only those resources in a hierarchical collection for which the statistics have changed since the last time that statistics were gathered for the collection. A lockless data structure is also described for storing the subtree-level change information in which an identifier corresponding to each subtree in a collection containing a changed resource may be stored. In one embodiment of the invention, the immediate parent resource of a particular modified resource may be omitted from the subtree table by leveraging modification time stamps while gathering statistics based on tracked subtree-level information.

These techniques make it possible to keep statistics for a collection up-to-date, thereby optimizing queries on the collection, without degrading the performance of client operations in the database system.

Gathering Statistics Based on Container-Level Modification Times

For purposes of illustration, the embodiments of the invention are described with respect to a database system managing a repository of hierarchically-organized files and folders. However, the embodiments of the invention may be applied to any collection of hierarchically-organized data.

Many times, container-level modification time stamps are maintained at one or more folders of a hierarchically-organized data repository, e.g., for caching or directory listings purposes. A time stamp may represent one or more of a date and a time. For simplicity of explanation, the information reflected in a time stamp is herein referred to as a "time".

Accordingly, a container-level modification time stamp stored at a particular folder may reflect the latest time that one or more of the immediate children of the particular folder were modified. A container-level modification time stamp for the particular folder may also reflect the latest time that the particular folder itself has changed.

Figure 1:
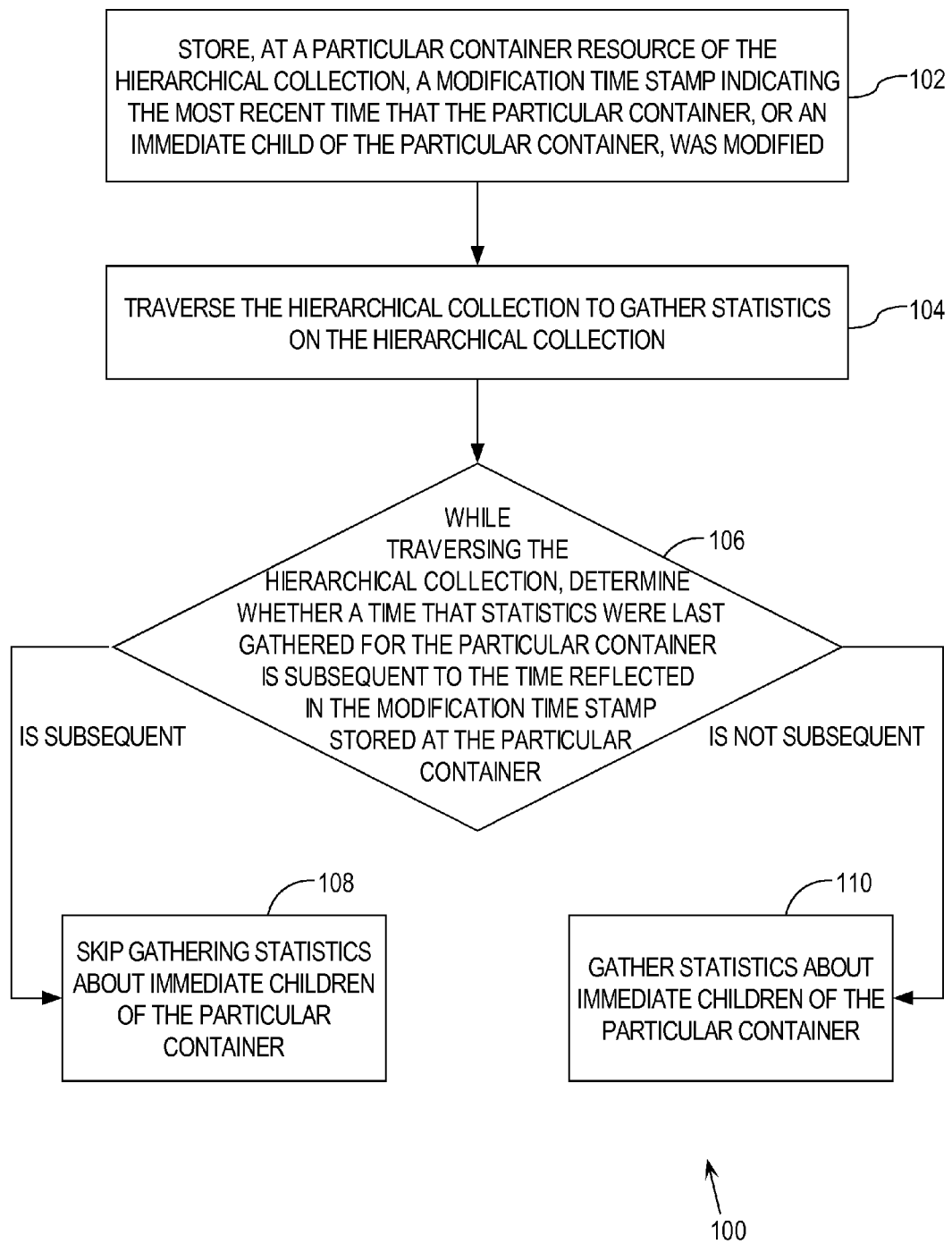
FIG. 1 illustrates an example method of gathering statistical information from resources in a particular hierarchical collection based on container-level modification time stamps.

A database system may leverage container-level modification time stamps in order to gather statistical information from only those subtrees of a hierarchical collection that include resources that have changed since the last time that statistics were gathered for the collection. FIG. 1 illustrates an example method 100 of gathering statistical information from resources in a particular hierarchical repository based on container-level modification time stamps.

Figure 2:
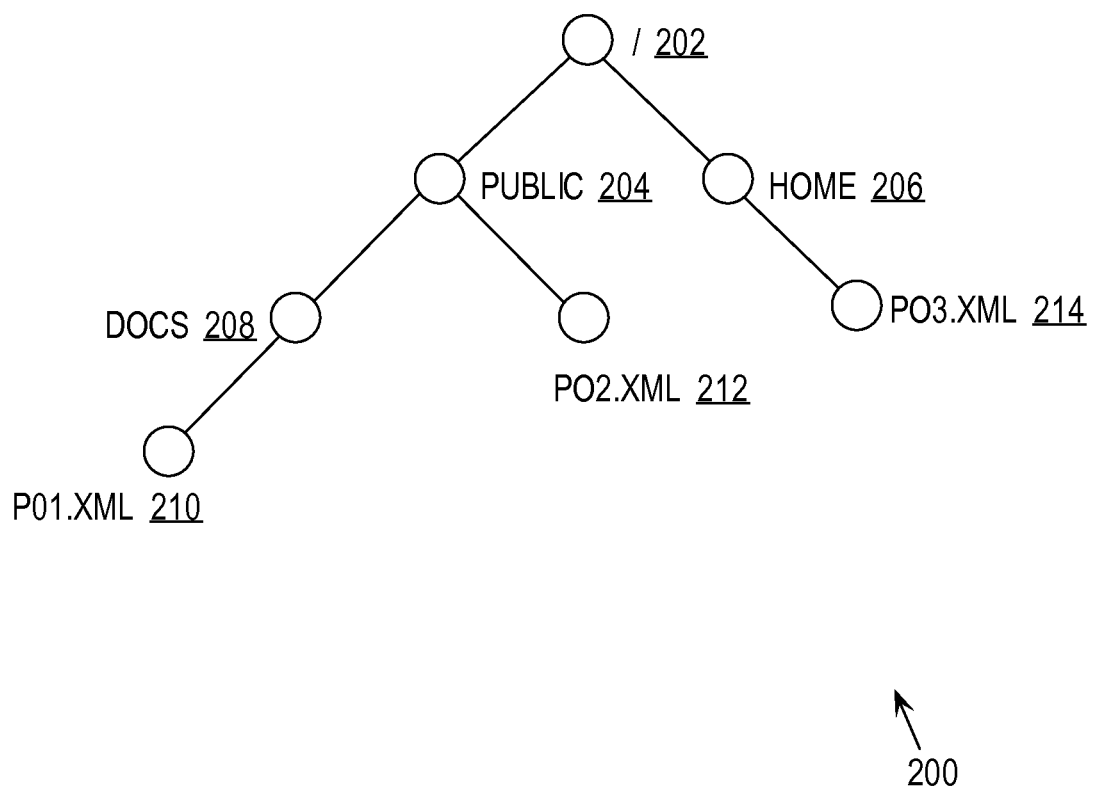
FIG. 2 illustrates an example hierarchically-organized repository.

At step 102, a modification time stamp is stored at a particular container resource of the hierarchical collection, which time stamp indicates the most recent time that the particular container, or an immediate child of the particular container, was modified. For example, FIG. 2 illustrates an example hierarchically-organized repository 200 including a root folder 202, public folder 204, home folder 206, docs folder 208, and xml files 210-214. In this example, a modification time stamp reflecting Jun. 4, 2009 at 10:00:00 AM is stored at public folder 204. This modification time stamp reflects the latest time that a change was made to public folder 204, or one of the immediate children under the folder, e.g., addition or deletion of a resource, renaming of a resource, etc. The modification time stamp may be stored by a database system managing repository 200, or may be stored by another entity, such as an operating system.

At step 104, the hierarchical collection is traversed to gather statistics on the hierarchical collection. For example, a database system managing repository 200 traverses repository 200 to gather statistical information. In one embodiment of the invention, traversing a hierarchical collection includes visiting one or more of the resources in the repository to gather information about changed aspects of the resources. Such a traversal may be a top-down traversal, or any other kind of traversal method.

At step 106, while traversing the hierarchical collection, it is determined whether a time that statistics were last gathered for the particular container is subsequent to the time reflected in the modification time stamp stored at the particular container. For example, statistics were last gathered for each resource in repository 200 on Jul. 10, 2009 at 10:00:00 AM. In this example, statistics were last gathered for each resource in repository 200 at the same time. However, each resource may have a distinct time at which statistics were last gathered for the resource within the embodiments of the invention. In one embodiment of the invention, a time stamp reflecting the time at which statistics were last gathered for a particular resource is stored at the particular resource. In another embodiment of the invention, a time stamp reflecting the time at which statistics were last gathered for a particular resource is stored remotely from the particular resource.

Continuing with the explanation of step 106, the database system inspects the modification time stamp stored at public folder 204, which reflects Jun. 4, 2009 at 10:00:00 AM, and the database determines that the time that statistics were last gathered for public folder 204 is subsequent to the time reflected in the modification time stamp stored at public folder 204.

At step 108, in response to determining that the time that statistics were last gathered for the particular container is subsequent to the time reflected in the modification time stamp, gathering statistics about immediate children of the particular container is skipped. For example, in response to determining that public folder 204 was modified previous to the time that statistics were last gathered for public folder 204, the database system skips gathering statistics about the immediate children of public folder 204. Thus, the database system does not inspect the immediate children of public folder 204, including docs folder 208, and xml files 212 and 214, for changed statistical information.

As a further example, home folder 206 is associated with a modification time stamp reflecting Aug. 4, 2009 at 10:00:00 AM. While traversing repository 200, at steps 104-106 of method 100, the database system inspects the modification time stamp stored at home folder 206, which reflects Aug. 4, 2009 at 10:00:00 AM, and the database determines that the time that statistics were last gathered for home folder 206 is not subsequent to the time reflected in the modification time stamp stored at home folder 206.

Thus, method 100 continues to step 110, at which statistics are gathered about immediate children of the particular container. For example, in response to determining that the time that statistics were last gathered for home folder 206 is not subsequent to the time reflected in the modification time stamp for home folder 206, the database system gathers information for the immediate children of home folder 206, i.e., xml file 214. In one embodiment of the invention, home folder 206 is also inspected for changes in response to determining that the modification time for home folder 206 is subsequent to the last time statistics were gathered for home folder 206.

According to certain embodiments of the invention, the modification time stamp of public folder 204 only reflects modifications to the immediate children of public folder 204, and does not reflect modifications made to child resources two or more steps under public folder 204, such as xml file 210. Thus, in this embodiment of the invention, the database system determines whether a time that statistics were last gathered for docs folder 208 is subsequent to the time reflected in the modification time stamp stored at docs folder 208, because xml file 210 may have changed subsequent to gathering statistical information for the immediate children of docs folder 208. Such a modification to the immediate children of docs folder 208 would not be reflected in the modification time stamp of public folder 204.

Gathering Statistics Based on Minimal Stored Subtree-Level Information

The above-described method of using container-level modification time stamps to selectively gather statistical information from a hierarchical collection assures that the maximum cost for gathering statistics for a particular hierarchical collection is proportional to the total number of subtrees in the collection or to the total number of changes in the collection since the last time statistics were gathered for the collection. The method is an improvement over the traditional method of gathering statistical data from every resource every time, the cost of which is proportional to the total number of resources in the hierarchical collection.

Further efficiency can be achieved by tracking minimal subtree-level information for the collection. The tracked information may identify subtrees in the collection that contain resources that have changed since the last time statistical information was gathered for the collection. A database system may use such tracked information to gather statistical information from only those subtrees that contain one or more changed resources.

For example, in the context of repository 200, if xml file 210 is modified, then all of the subtrees that include xml file 210 have been modified. Thus, the subtree rooted at docs folder 208 may be marked as modified, as well as the subtrees rooted at public folder 204 and at root folder 202. All of the subtrees corresponding to a particular changed resource are recorded because most changes affect the statistics of all of these subtrees.

It is infeasible to store such change information as part of the pertinent resources of the collection. To change a value in a particular resource of a collection, the resource is locked, which maintains the consistency of the resource data. For example, if the subtree-level change information is stored as part of the resources of repository 200, and xml file 210 is modified, then docs folder 208, public folder 204, and root folder 202 are locked in order to update the change information at each of these folders. Thus, a substantial portion of repository 200 would be locked with every modification of a resource therein, which effectively serializes resource modifications within repository 200.

Building a Lockless Data Structure to Maintain Subtree-Level Information

Therefore, a lockless mechanism is herein described for storing subtree-level change information to track subtrees in a hierarchical collection containing resources that have changed subsequent to the last time statistics were gathered for the hierarchical collection. For ease of explanation, the last time statistics were gathered for a hierarchical collection is referred to herein as the "last statistics gathering". In one embodiment of the invention, the lockless mechanism is a data structure to which subtree-level change information may be added. In this embodiment, the information added to the lockless data structure is never modified, which obviates data consistency issues. This lockless data structure may be distinct from one or more data structures containing the resources of the hierarchical collection. Thus, every change is tracked herein without causing undue burden on the structures containing the hierarchically-organized data.

Figure 3:
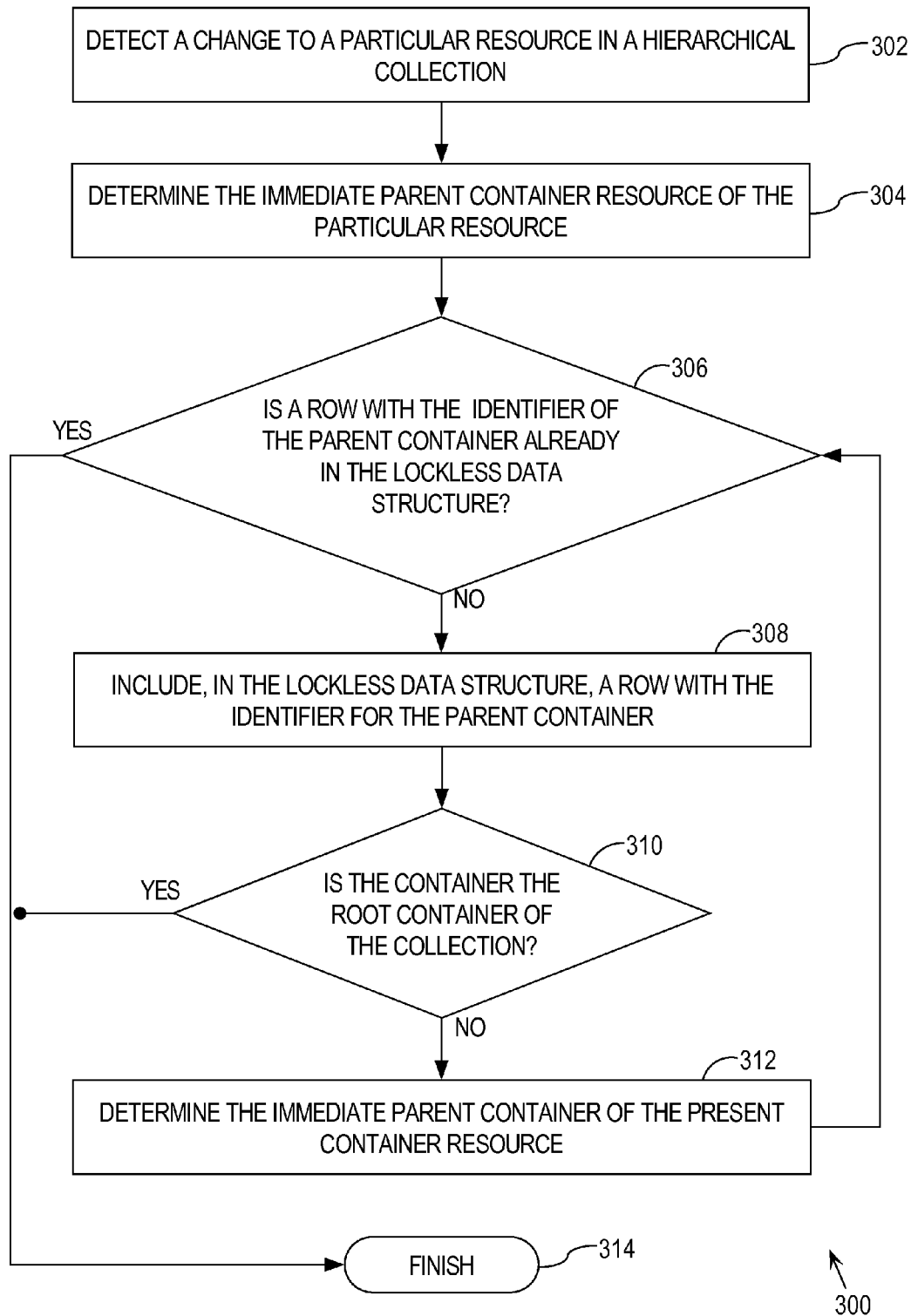
FIG. 3 illustrates an example method of including information in a subtree table to track these subtrees in a hierarchical collection that include a particular changed resource.

Within the embodiments of the invention, the lockless data structure may be any type of data structure for containing information. For purposes of illustration, the data structure is described as a database table, referred to herein as the "subtree table". Subtree-level information may be represented by rows in the subtree table. FIG. 3 illustrates an example method 300 of including information in a subtree table to track the subtrees in a hierarchical collection that include a particular changed resource.

At step 302, a change to a particular resource in a hierarchical collection is detected. For example, in FIG. 4, repository 200 has been modified from the configuration shown in FIG. 2 to include a new xml file 402 under public folder 204. In one embodiment of the invention, a change to a particular resource is defined to include adding the particular resource, deleting the particular resource, modifying the name of the particular resource, changing the position of a resource within a hierarchy, etc. Thus, the database system managing repository 200 detects the addition of xml file 402 as a change to xml file 402.

At step 304, the immediate parent container resource of the particular resource is determined. Continuing with the previous example, the database system determines that the immediate parent container resource of xml file 402 is public folder 204.

At step 306, it is determined whether a row with the identifier of the parent container already exists in the lockless data structure. For example, the database system determines whether a subtree table includes a row with the identifier for public folder 204. The database system may make this determination in any number of ways within the embodiments of the invention. For example, the database system may inspect each individual row in the subtree table. Also, if the database system maintains an index on a identifier column of the subtree table, the database system may use the index to determine whether the identifier for public folder 204 exists in the subtree table. In the previous example, the addition of xml file 402 is the first change after the database system last collected statistics for repository 200. Thus, as discussed in further detail below, the subtree table contains no rows. As such, the database system determines that a row with the identifier for public folder 204 is not included in the subtree table.

In one embodiment of the invention, if the row with the identifier of the parent container already exists in the lockless data structure, then method 300 is finished at step 314. This is based on the assumption that if a particular container is included in the subtree table, then all of the ancestor containers of the particular container are also included in the subtree table. However, if all ancestors of a particular container are not automatically included in the subtree table, then method 300 may continue to step 312 upon determining that the row with the identifier of the parent container already exists in the lockless data structure. Step 312 is described in more detail hereafter.

If the row with the identifier of the parent container does not already exist in the lockless data structure, then method 300 continues to step 308. At step 308, a row with the identifier for the parent container is included in the lockless data structure. For example, the database system includes a row with the identifier for public folder 204 in the subtree table.

At step 310, it is determined whether the container is the root container of the collection. For example, the database system determines whether public folder 204 has any ancestor folders. In this example, root folder 202 is an ancestor of public folder 204. Therefore, the database system determines that the public folder 204 is not the root container of the collection. The database system may make this determination in any number of ways within the embodiments of the invention.

If the container is not the root container of the collection, then method 300 continues to step 312. At step 312, the immediate parent container of the present container is determined. For example, the database system determines that root folder 202 is the immediate parent container of public folder 204.

Method 300 then continues to step 306, at which point it is determined whether a row with the identifier for root folder 202 is already in the subtree table. As previously indicated, the subtree table currently only contains one row corresponding to public folder 204. Therefore, the database system determines that a row with the identifier for root folder 202 in not in the table. According to step 308, a row with the identifier for root folder 202 is included in the subtree table.

At step 310, it is determined whether root folder 202 is the root container of repository 200. Because root folder 202 has no parent folders, the database system determines that root folder 202 is the root container of repository 200. Method 300 then finishes at step 314, because all of the identifiers for containers corresponding to the subtrees containing the changed xml file 402 are included in the subtree table. Thus, the lockless data structure corresponding to a particular collection includes every ancestor container resource of any resource that has changed since the last statistics gathering for the particular collection.

Figure 5:
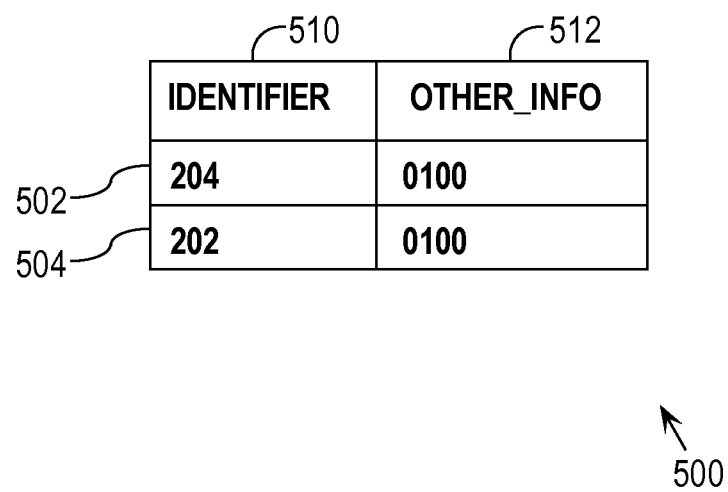
FIG. 5 illustrates an example subtree table.

An example subtree table 500, populated according to the previous example, is illustrated in FIG. 5. Subtree table 500 includes row 502 with the identifier for public folder 204, "204", and row 504 with the identifier for root folder 202, "202". The identifiers are included in column 510 of subtree table 500.

In addition to identifiers, the rows of a subtree table, such as subtree table 500, may also include information about the respective changes that caused each of the rows to be inserted into the table. Such information may be included in a column such as column 512. Information in column 512 may include one or more of: (a) a time stamp reflecting a time that a change was made, (b) a flag indicating that a change includes a modified name for the resource, (c) a flag indicating that a change includes an added resource, (d) a flag indicating that a change includes a deleted resource, and (e) a flag indicating any other aspect of a change to a resource, etc.

The above-mentioned time stamp and flags may be formatted in any number of ways. For example, the flags may be collectively represented as a binary number, where each position in the binary number represents a particular flag. Thus, each of the above mentioned flags may correspond to a particular bit of a four-digit binary number, in the listed order, i.e., [name_change][added_resource][deleted_resource][other]. In one example, the binary number 1000 indicates a modified resource name, 0100 indicates an added resource, 0010 indicates a deleted resource, and 0001 may indicate any number of other possible change types. In subtree table 500, rows 502 and 504 include information in column 512, i.e., "0100", that indicates that the change in the subtrees to which the rows correspond includes an added resource. Column 512 is a non-limiting example of additional information that may be included in a subtree table, such as subtree table 500.

No locks are required to maintain subtree-level information in a data structure such as subtree table 500. Because subtree-level change information is used for statistics gathering purposes, such information is not subject to strict data concurrency and consistency requirements. In fact, in one embodiment of the invention, the determination of step 306 is omitted from method 300, such that the database system does not check for duplicate entries when tracking subtree-level information. Multiple rows with the same identifier in the lockless data structure, e.g., resulting from a race condition, are acceptable within the embodiments of the invention. For example, one embodiment of the invention treats multiple rows that correspond to the same subtree as a single row. In another embodiment of the invention, prior to gathering statistical information for the collection, as described in more detail below, duplicate rows may be eliminated.

Using the Table to Traverse a Subset of the Hierarchy for Statistics

Using the subtree-level information described above, a database system may gather statistical information for a hierarchically-organized collection from only those subtrees that include resources that have changed since the last statistics gathering for the collection. In one embodiment of the invention, a database system only gathers statistical information from the immediate children of container resources that correspond to identifiers included in a lockless data structure, such as subtree table 500 (FIG. 5).

To collect statistics, the database system traverses the resources in the hierarchy. Traversal methods may be made in any number of ways within the embodiments of the invention. For example, a hierarchically-organized collection may be traversed using a post-order node traversal.

Figure 4:
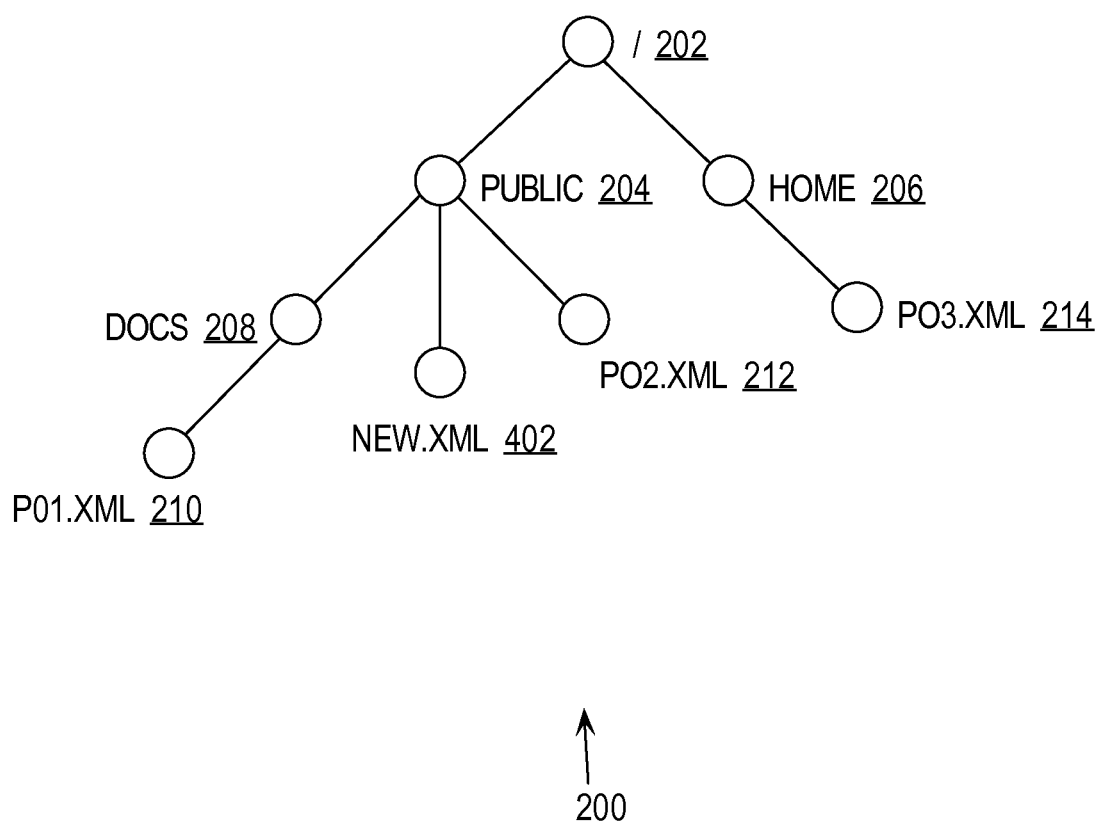
FIG. 4 illustrates an example hierarchically-organized repository.
Figure 6:
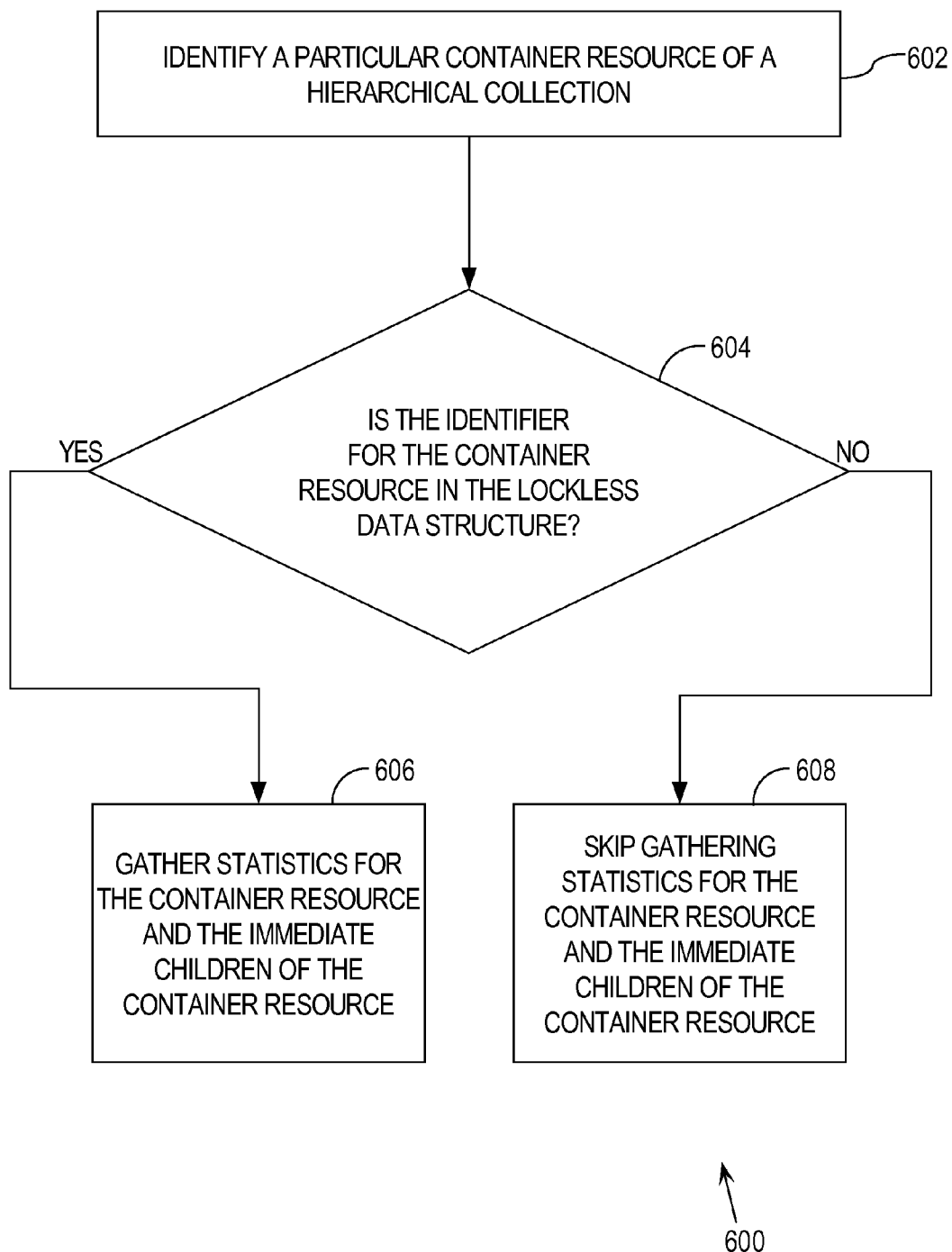
FIG. 6 illustrates an example method of determining whether to gather statistics from the immediate child resources of a particular container resource in a hierarchical collection.

FIG. 6 illustrates an example method 600 of determining whether to gather statistics from the immediate child resources of a particular container resource in a hierarchical collection. At step 602, a particular container resource of a hierarchical collection is identified. For example, the database system managing repository 200, as illustrated in FIG. 4, identifies public folder 204 as a container resource in repository 200.

At step 604, it is determined whether the identifier for the container resource is in the lockless data structure. Continuing with the previous example, the database system determines that the identifier for public folder 204, "204", is included in subtree table 500 at row 502. In one embodiment of the invention, the database system searches for the first instance of a row in the subtree table containing the sought identifier, and the database system ignores any other rows containing the same sought identifier. In another embodiment, the rows containing the sought identifier, other than the first instance of the row, are eliminated from the subtree table prior to using the subtree-level information stored therein to gather statistics for a particular hierarchical collection. In yet another embodiment of the invention, the database system identifies each row in the subtree table containing the sought identifier, which allows the database system to access any other information, e.g., included in column 512, about the type of change to which the rows correspond.

If it is determined at step 604 that the identifier for the container resource is in the lockless data structure, then, at step 606, statistics for the container resource and the immediate children of the container resource are gathered. For example, because the identifier for public folder 204 is included in subtree table 500, the database system gathers statistics for public folder 204, and for the immediate children of public folder 204, i.e., docs folder 208, and xml files 402 and 212. The database system does not gather statistics for xml file 210 because xml file 210 is not an immediate child of public folder 204, but is an immediate child of docs folder 208.

In one embodiment of the invention, the database system determines whether statistical information for the immediate children of docs folder 208 should be gathered based on whether the identifier of docs folder 208 is included in subtree table 500. For example, the database system identifies docs folder 208 as a container resource in repository 200 at step 602 of method 600. At step 604, the database system managing repository 200 determines that subtree table 500 does not include the identifier for docs folder 208, "208".

Method 600 continues to step 608, at which gathering statistics for the container resource and the immediate children of the container resource is skipped. Continuing with the previous example, the database system does not collect statistics information for docs folder 208, or for the immediate children of docs folder 208, i.e., xml file 210. As described above, in connection public folder 204, the database system may have already gathered information about docs folder 208 upon determining that the identifier for public folder 204, which is the immediate parent of docs folder 208, is included in subtree table 500.

As a further example, the database system identifies root folder 202, at step 602 of method 600. At step 604, the database system determines that the identifier for root folder 202, "202", is included in subtree table 500 at row 504. Therefore, the method continues to step 606, where the database system gathers statistics for root folder 202, and the immediate children of root folder 202, i.e., public folder 204, and home folder 206. One embodiment of the invention tracks container resources from which information has already been collected to ensure that the database system only collects statistical information from each container resources once. In this embodiment of the invention, the database system of the above examples would recognize that statistical information has already been collected for public folder 204, and would not collect statistics from that folder a second time in connection with root folder 202.

In another embodiment of the invention, once the database system determines that the identifier of a particular container resource is included in the subtree table, the database system gathers statistical information for the ancestors of the particular container resource without determining whether the identifiers for the ancestor container resources are included in the subtree table. This embodiment of the invention is based on the assumption that if one ancestor container resource is included in the subtree table, then all of the ancestor container resources of the included container resource are also included in the subtree table, as described above.

A database system may maintain a foreign key on the identifiers in a subtree table to refer to the identifiers stored in data structures for the corresponding hierarchically-organized collection. Such a foreign key allows the database system to maintain referential integrity between these data structures, such that the database system can ensure that the subtree table does not contain rows with identifiers of resources that do not exist in the data structures for the corresponding collection.

After information has been gathered for each resource corresponding to subtrees included in the subtree table, all rows in the subtree table are deleted. In one embodiment of the invention, a particular row is deleted at the time that the database system gathers statistical information from the subtree corresponding to the particular row.

If a particular row is added to a subtree table while the database system is presently gathering statistics based on the information in the subtree table, then that particular row may be ignored during the present statistics gathering. The particular row is not deleted from the subtree table when the database system is done with the present statistics gathering, thus preserving the newly-added row for a future statistics gathering.

Furthermore, information about the type of changes in the subtrees that are included in a subtree table may be used to determine the type of statistical information that is gathered for the respective subtrees. For example, row 502 of subtree table 500 (FIG. 5) indicates that the change for public folder 204 includes an added resource, as described above. The database system managing repository 200 may use this information to only gather statistical data from the subtree rooted at public folder 204 that would be affected by an added resource.

Using the Lockless Data Structure with
Container-Level Modification Times

In one embodiment of the invention, the immediate parent resource of a particular changed resource may be omitted from the subtree table. In this embodiment, the database system determines whether to gather statistical information from the immediate children of container resources that are the immediate children of containers included in the subtree table based on modification time stamps. FIG. 7 illustrates an example method 700 of gathering statistical information based on modification time stamps and subtree-level information stored in a lockless data structure.

Figure 8:
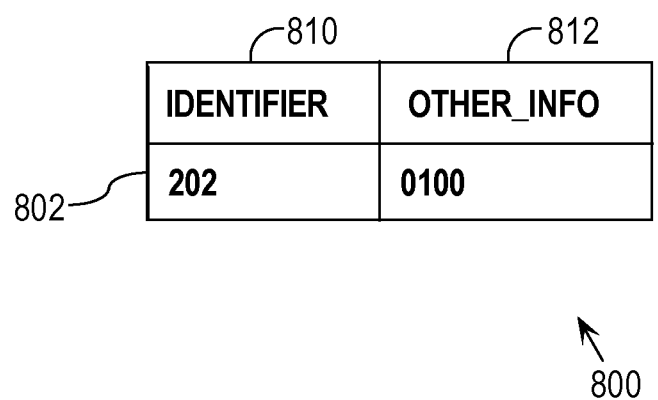
FIG. 8 illustrates an example subtree table.

At step 702, all of the ancestor container resources of a changed resource are included in a lockless data structure, except for the immediate parent of the changed resource. For example, a database system managing repository 200, illustrated in FIG. 4, determines that xml file 402 has changed, i.e., has been added under public folder 204. In response to detecting the change, the database system includes, in a corresponding subtree table such as subtree table 800 of FIG. 8, all of the ancestor container resources of public folder 204, which consist of root folder 202, but does not include public folder 204. Thus, subtree table 800 includes only row 802 with the identifier for root folder 202, "202".

At step 704, statistics for resources that are immediate children of container resources, the identifiers of which are included in the lockless data structure, are gathered. For example, subtree table 800 only includes root folder 202, as populated in the previous example. According to certain embodiments of the invention, the database system gathers statistics for the immediate children of root folder 202, which was included in subtree table 800. The immediate children of root folder 202 are public folder 204 and home folder 206.

At step 706, a particular container resource is identified, (a) the identifier of which is not included in the lockless data structure, and (b) that is the immediate child of a container resource, the identifier of which is included in the lockless data structure. For example, the database system identifies public folder 204 as a container resource that both (a) has a identifier that is not included in the subtree table, and (b) is the immediate child of root folder 202, the identifier of which is included in the subtree table.

At step 708, it is determined whether a time that statistics were last gathered for the particular container resource is subsequent to the time reflected in a modification time stamp stored at the particular container resource. For example, when xml file 402 was added to public folder 204, a modification time stamp for public folder 204 was updated to reflect the date and time that xml file 402 was added. In this example, the database system determines that the modification time stamp for public folder 204 reflects a time that is subsequent to the last time that statistics were gathered for repository 200.

If the time that statistics were last gathered for the particular container resource is not subsequent to the time reflected in a modification time stamp stored at the particular container resource, then method 700 continues to step 710. At step 710, statistics about immediate children of the particular container resource are gathered. Because the modification time stamp for public folder 204 reflects a time that is subsequent to the last time that statistics were gathered for repository 200, the database system gathers statistical information about the immediate children of public folder 204, i.e., docs folder 208 and xml files 402 and 212.

As a further example, if at step 706, the database system identifies home folder 206, then the database system would determine whether the time that statistics were last gathered for repository 200 is subsequent to a time reflected in a modification time stamp associated with home folder 206, according to step 708. As with the previous example, only public folder 204 includes a resource that was changed subsequent to the last time statistics were gathered for repository 200. Therefore, the time that statistics were last gathered for repository 200 is subsequent to the time reflected in the modification time stamp associated with home folder 206.

Thus, method 700 continues to step 712, at which gathering statistics about immediate children of the particular container resource is skipped. For example, the database system does not gather statistics about the immediate children of home folder 206, i.e., xml file 214, because the modification time stamp indicates that the immediate children of home folder 206 have not changed subsequent to the last time statistics were gathered for repository 200.

Aggregating Statistics

The statistical information gathered for a hierarchical collection according to certain embodiments of the invention above, including the embodiments illustrated in method 100 (FIG. 1) and method 600 (FIG. 6), are selectively gathered from those resources associated with subtrees of the collection that include changed resources. Therefore, a database system may not gather statistical information from every resource in a hierarchical collection every time that statistics are gathered.

Statistics for the entire collection may be calculated based on the selectively gathered statistical information. A database system may aggregate the selectively gathered statistical information described above with statistics determined for the entire collection based on the last statistical gathering for the collection. Such aggregation of statistics may be accomplished in any number of ways within the embodiments of the invention.

For example, if the subject statistic is a total, the changes in the statistics for a particular subtree, gathered according to certain embodiments of the invention, are added to the previously determined statistics for the particular subtree.

As another example, if the subject statistic is an average, then the changes gathered for a particular subtree, according to certain embodiments of the invention, are weighted using the base of the average, e.g., the total number of resources in the particular subtree. The weighted change information is then aggregated with the previous statistics for the particular subtree that have also been weighted in a similar manner.

Figure 9:
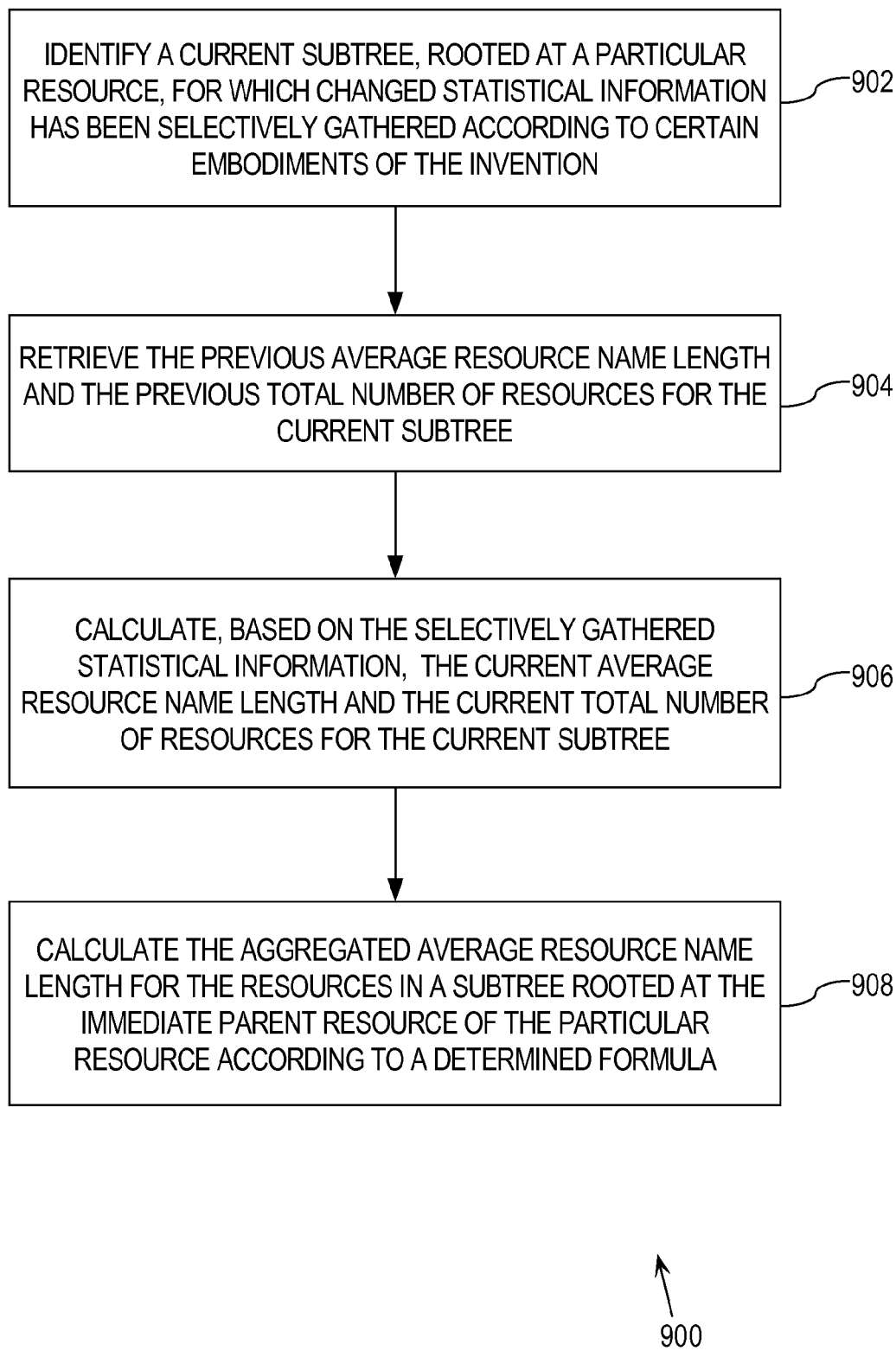
FIG. 9 illustrates an example method of aggregating statistical information for multiple subtrees in a hierarchical collection.

An example of an average-type statistic is the average resource name length for the resources in a particular subtree. FIG. 9 illustrates an example method 900 of aggregating (a) changed resource name length statistics for a particular subtree rooted at a particular resource of a hierarchically-organized collection with (b) resource name length statistics determined for a subtree rooted at the resource that is the immediate parent of the particular resource.

Figure 10:
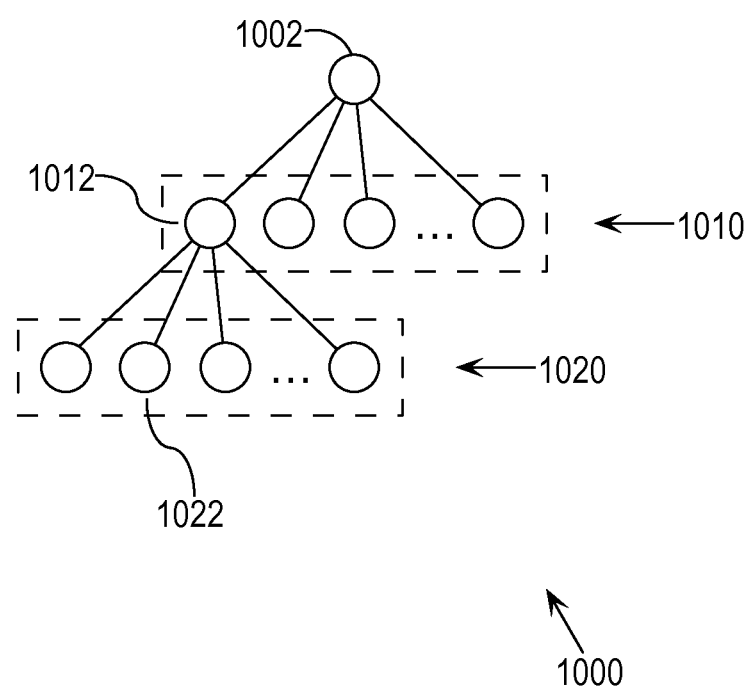
FIG. 10 illustrates an example hierarchically-organized collection.

At step 902, a current subtree rooted at a particular resource is identified, for which changed statistical information has been selectively gathered according to certain embodiments of the invention described above. For example, a database system managing hierarchically-organized collection 1000, illustrated in FIG. 10, identifies the subtree rooted at resource 1012 as the current subtree. Collection 1000 illustrates at least two subtrees, one rooted at resource 1002, and another rooted at resource 1012. The subtree rooted at resource 1002 is associated with a set of immediate child resources 1010, which includes resource 1012. The subtree rooted at resource 1012 is associated with a set of immediate child resources 1020, which includes resource 1022. Collection 1000 may include other resources not shown in FIG. 10.

At step 904, the previous average resource name length and the previous total number of resources are retrieved for the current subtree. For example, the database system managing collection 1000 retrieves information indicating that, as of the last statistics gathering, the subtree rooted at resource 1012 included $n_1$ resources, and had an average resource name length of $a_1$ among all of the resources included in the subtree.

At step 906, the current average resource name length and the current total number of resources for the current subtree are calculated based on the selectively gathered statistical information. For example, the resource name of one or more of the resources in the subtree rooted at resource 1012 was changed since the previous statistics gathering. Therefore, an embodiment of the invention gathered information about the lengths of the resource names of these resources in the subtree rooted at resource 1012 and the current total number of resources in the subtree. The database system managing collection 1000 determines that the current total number of resources in the subtree is $n_1'$, and the current average resource name length is $a_1'$ based on the selectively gathered statistical information.

At step 908, the aggregated average resource name length for the resources in a subtree rooted at the immediate parent resource of the particular resource is calculated according to a determined formula. For example, the immediate parent resource of resource 1012 is resource 1002, which has a total number N of immediate children and an average resource name length of A for the nodes in the subtree. The numbers N and A do not take into account any changes in the node count and average resource name length of the subtree rooted at resource 1012. Furthermore, in this example, N and A are assumed to include any changed statistical information for the other children of resource 1002, i.e., child resources 1010, excluding resource 1012. In one embodiment of the invention, the database system calculates the aggregated average resource name length for the resources in the subtree rooted at resource 1002 according to the following Eq. 1:

$$\frac{A \cdot N + n1 \cdot a1 - n1 \cdot a1}{N - n1 + n1} \quad \text{Eq. 1}$$

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
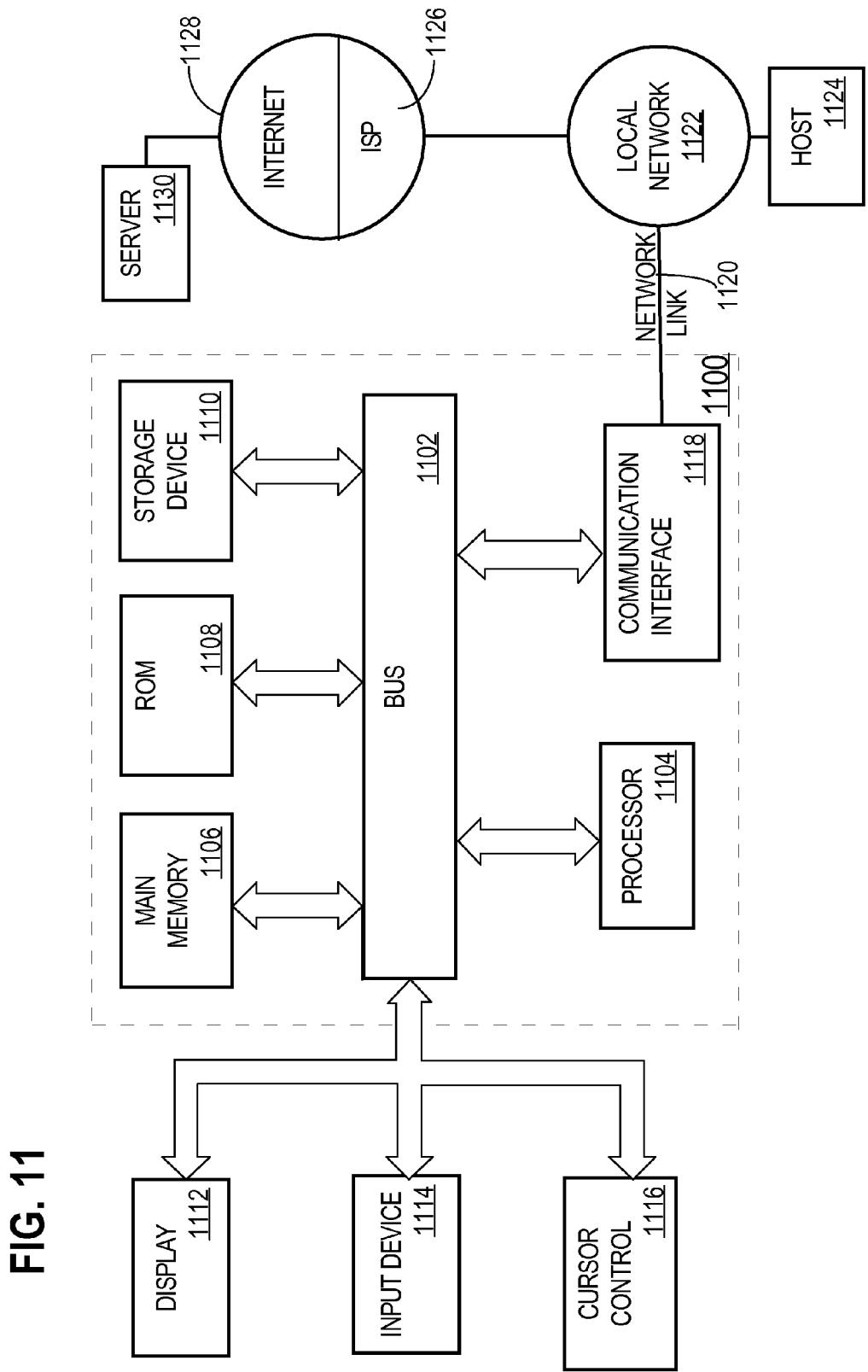
FIG. 11 is a block diagram of a computer system on which embodiments of the invention may be implemented.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hardwired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-executed method for gathering statistics from changed subtrees in a hierarchically-organized collection of resources comprising:
    after traversing the collection of resources to gather statistics for the collection in connection with a first traversal of the collection that is performed previous to a second traversal of the collection:
        in response to detecting a change to a particular resource in the hierarchically-organized collection of resources:
            identifying a set of ancestor container resources of the particular resource, and
            adding, to a data structure, an identifier for each container resource of the set of ancestor container resources of the particular resource;
    while traversing the collection to gather statistics for the collection in connection with the second traversal of the collection:
        determining whether an identifier for a first container resource in the collection of resources is stored in the data structure;
        wherein the set of ancestor container resources comprises the first container resource;
        in response to determining that an identifier for the first container resource is stored in the data structure, gathering statistics for one or more child resources of the first container resource to produce gathered statistics;
        determining whether an identifier for a second container resource in the collection of resources is stored in the data structure;
        in response to determining that an identifier for the second container resource is not stored in the data structure, skipping gathering statistics for immediate children of the second container resource;

wherein the method is performed by one or more computing devices.

2. The computer-executed method of claim 1, wherein the set of ancestor container resources includes every ancestor container resource of the particular resource.

3. The computer-executed method of claim 1 wherein;
the set of ancestor container resources does not include an immediate parent container resource of the particular resource; and
gathering statistics for one or more child resources of the first container resource further comprises:
identifying, in the collection, a particular container resource (a) an identifier of which is not included in the data structure, and (b) that is an immediate child of the first container resource;
determining whether a time that statistics were last gathered for the particular container resource precedes a time reflected in a modification time stamp stored at the particular container resource;
wherein the modification time stamp indicates the most recent time that an immediate child of the particular container resource was modified; and
in response to determining that the time that statistics were last gathered for the particular container resource precedes the time reflected in the modification time stamp, gathering statistics for immediate children of the particular container resource.

4. The computer-executed method of claim 1, further comprising:
while traversing the collection to gather statistics for the collection in connection with the second traversal of the collection:
determining that a particular identifier is included in the data structure more than once; and
interpreting the particular identifier as included in the data structure only once.

5. The computer-executed method of claim 1,
wherein the data structure is a table that is distinct from one or more tables representing the collection; and
wherein the step of adding, to the data structure, an identifier for each container resource of the set of ancestor container resources further comprises:
adding, to the data structure, a row with an identifier for a particular container resource of the set of ancestor container resources.

6. The computer-executed method of claim 5, wherein the step of adding, to the data structure, an identifier for each container resource of the set of ancestor container resources further comprises:
adding, to the row, information about the change to the particular resource comprising one or more of:
(a) a time stamp reflecting a time that the change was made,
(b) a flag indicating that the change includes a modified name for the particular resource,
(c) a flag indicating that the change includes adding the particular resource,
(d) a flag indicating that the change includes deleting the particular resource, and
(e) a flag indicating any other aspect of the change to the particular resource.

7. The computer-executed method of claim 5,
wherein the data structure includes a foreign key for the identifiers that are included in the data structure; and
wherein the foreign key links the identifiers included in the data structure with corresponding identifiers included in the one or more tables representing the collection.

8. The computer-executed method of claim 1, further comprising:
prior to adding, to the data structure, a particular identifier, determining whether the particular identifier is already included in the data structure;
in response to determining that the particular identifier is not included in the data structure, adding the particular identifier to the data structure.

9. The computer-executed method of claim 1, further comprising updating statistics stored for the first container resource based on the gathered statistics for the one or more child resources.

10. The computer-executed method of claim 1, further comprising: in response to determining that an identifier for the first container resource is stored in the data structure, gathering statistics for immediate children of each particular ancestor container resource of the first container resource, without determining whether an identifier for each particular ancestor container resource is included in the data structure.

11. The computer-executed method of claim 1, wherein the step of adding, to the data structure, an identifier for each container resource of the set of ancestor container resources further comprises:
determining whether an identifier for a particular container resource of the set of ancestor container resources is included in the data structure; and
in response to determining that the identifier for the particular container resource is included in the data structure, skipping adding, to the data structure, identifiers for those container resources that are ancestors of the particular container resource.

12. The method of claim 1, wherein gathering statistics comprises determining one or more of:
a number of non-container resources under a container resource in the hierarchically-organized collection of resources,
a total number of container resources under a container resource in the hierarchically-organized collection of resources,
a total number of resources in a subtree of the hierarchically-organized collection of resources,
a number of data blocks occupied by a subtree of the hierarchically-organized collection of resources, or
an average length of resource names in a subtree of the hierarchically-organized collection of resources.

13. The method of claim 1, wherein the data structure is a lockless data structure, further comprising:
after traversing the collection of resources to gather statistics for the collection in connection with the first traversal of the collection and prior to traversing the collection to gather statistics for the collection in connection with the second traversal of the collection:
in response to detecting a second change to a second resource in the hierarchically-organized collection of resources:
identifying a second set of ancestor container resources of the second resource, and
adding, to the lockless data structure, an identifier for each container resource of the second set of ancestor container resources of the particular resource.

14. One or more non-transitory computer-readable media that stores instructions, for gathering statistics from changed subtrees in a hierarchically-organized collection of resources, wherein the instructions include:
  instructions which, when executed by one or more hardware processors, cause, after traversing the collection of resources to gather statistics for the collection in connection with a first traversal of the collection that is performed previous to a second traversal of the collection:
    in response to detecting a change to a particular resource in the hierarchically-organized collection of resources:
      identifying a set of ancestor container resources of the particular resource, and
      adding, to a data structure, an identifier for each container resource of the set of ancestor container resources of the particular resource;
  instructions which, when executed by one or more hardware processors, cause, while traversing the collection to gather statistics for the collection in connection with the second traversal of the collection:
    determining whether an identifier for a first container resource in the collection of resources is stored in the data structure;
    wherein the set of ancestor container resources comprises the first container resource;
    in response to determining that an identifier for the first container resource is stored in the data structure, gathering statistics for one or more child resources of the first container resource to produce gathered statistics;
    determining whether an identifier for a second container resource in the collection of resources is stored in the data structure;
    in response to determining that an identifier for the second container resource is not stored in the data structure, skipping gathering statistics for immediate children of the second container resource.

15. The one or more non-transitory computer-readable media of claim 14, wherein the set of ancestor container resources includes every ancestor container resource of the particular resource.

16. The one or more non-transitory computer-readable media of claim 14, wherein:
  the set of ancestor container resources does not include an immediate parent container resource of the particular resource; and
  the instructions for gathering statistics for one or more child resources of the first container resource further comprise:
    instructions which, when executed by one or more hardware processors, cause identifying, in the collection, a particular container resource (a) an identifier of which is not included in the data structure, and (b) that is an immediate child of the first container resource;
    instructions which, when executed by one or more hardware processors, cause determining whether a time that statistics were last gathered for the particular container resource precedes a time reflected in a modification time stamp stored at the particular container resource;
    wherein the modification time stamp indicates the most recent time that an immediate child of the particular container resource was modified; and
    instructions which, when executed by one or more hardware processors, cause, in response to determining that the time that statistics were last gathered for the particular container resource precedes the time reflected in the modification time stamp, gathering statistics for immediate children of the particular container resource.

17. The one or more non-transitory computer-readable media of claim 14, wherein the instructions comprise:
  instructions which, when executed by one or more hardware processors, cause, while traversing the collection to gather statistics for the collection in connection with the second traversal of the collection:
    determining that a particular identifier is included in the data structure more than once; and
    interpreting the particular identifier as included in the data structure only once.

18. The one or more non-transitory computer-readable media of claim 14,
  wherein the data structure is a table that is distinct from one or more tables representing the collection; and
  wherein the instructions for adding, to the data structure, an identifier for each container resource of the set of ancestor container resources further comprise instructions which, when executed by one or more hardware processors, cause adding, to the data structure, a row with an identifier for a particular container resource of the set of ancestor container resources.

19. The one or more non-transitory computer-readable media of claim 18, wherein instructions for adding, to the data structure, an identifier for each container resource of the set of ancestor container resources further comprise:
  instructions which, when executed by one or more hardware processors, cause adding, to the row, information about the change to the particular resource comprising one or more of:
    (a) a time stamp reflecting a time that the change was made,
    (b) a flag indicating that the change includes a modified name for the particular resource,
    (c) a flag indicating that the change includes adding the particular resource,
    (d) a flag indicating that the change includes deleting the particular resource, and
    (e) a flag indicating any other aspect of the change to the particular resource.

20. The one or more non-transitory computer-readable media of claim 18,
  wherein the data structure includes a foreign key for the identifiers that are included in the data structure; and
  wherein the foreign key links the identifiers included in the data structure with corresponding identifiers included in the one or more tables representing the collection.

21. The one or more non-transitory computer-readable media of claim 14, wherein the instructions further comprise:
  instructions which, when executed by one or more hardware processors, cause, prior to adding, to the data structure, a particular identifier, determining whether the particular identifier is already included in the data structure;
  instructions which, when executed by one or more hardware processors, cause, in response to determining that the particular identifier is not included in the data structure, adding the particular identifier to the data structure.

22. The one or more non-transitory computer-readable media of claim 13, further comprising instructions which, when executed by one or more hardware processors, cause updating statistics stored for the first container resource based on the gathered statistics for the one or more child resources.

23. The one or more non-transitory computer-readable media of claim 14, wherein the instructions comprise:
   instructions which, when executed by one or more hardware processors, cause, in response to determining that an identifier for the first container resource is stored in the data structure, gathering statistics for immediate children of each particular ancestor container resource of the first container resource, without determining whether an identifier for each particular ancestor container resource is included in the data structure.

24. The one or more non-transitory computer-readable media of claim 14, wherein instructions for adding, to the data structure, an identifier for each container resource of the set of ancestor container resources further comprise:
   instructions which, when executed by one or more hardware processors, cause determining whether an identifier for a particular container resource of the set of ancestor container resources is included in the data structure; and
   instructions which, when executed by one or more hardware processors, cause, in response to determining that the identifier for the particular container resource is included in the data structure, skipping adding, to the data structure, identifiers for those container resources that are ancestors of the particular container resource.

25. The one or more non-transitory computer-readable media of claim 14, wherein gathering statistics comprises determining one or more of:
   a number of non-container resources under a container resource in the hierarchically-organized collection of resources,
   a total number of container resources under a container resource in the hierarchically-organized collection of resources,
   a total number of resources in a subtree of the hierarchically-organized collection of resources,
   a number of data blocks occupied by a subtree of the hierarchically-organized collection of resources, or
   an average length of resource names in a subtree of the hierarchically-organized collection of resources.

26. The one or more non-transitory computer-readable media of claim 14, wherein the instructions further comprise instructions which, when executed by one or more hardware processors, cause, after traversing the collection of resources to gather statistics for the collection in connection with the first traversal of the collection and prior to traversing the collection to gather statistics for the collection in connection with the second traversal of the collection:
   in response to detecting a second change to a second resource in the hierarchically-organized collection of resources:
      identifying a second set of ancestor container resources of the second resource,
      wherein the data structure is a lockless data structure; and
      adding, to the lockless data structure, an identifier for each container resource of the second set of ancestor container resources of the particular resource.

\* \* \* \* \*

UNITED STATES PATENT AND TRADEMARK OFFICE
CERTIFICATE OF CORRECTION

| | |
|---|---|
| PATENT NO. | : 9,582,525 B2 |
| APPLICATION NO. | : 12/555198 |
| DATED | : September 8, 2009 |
| INVENTOR(S) | : Sam Idicula et al. |

Page 1 of 1

It is certified that error appears in the above-identified patent and that said Letters Patent is hereby corrected as shown below:

On the Title Page

OTHER PUBLICATIONS, Line 3, delete "http://dowload" and insert --http://download--

In the Claims

Column 20:
Claim 22, Line 66, delete "claim 13" insert --claim 14--

Signed and Sealed this
Fifth Day of June, 2018

Andrei Iancu
*Director of the United States Patent and Trademark Office*